United States Patent
Okagaki et al.

(10) Patent No.: US 12,099,228 B2
(45) Date of Patent: Sep. 24, 2024

(54) DIFFUSER AND LIGHTING APPARATUS

(71) Applicant: Mitsubishi Electric Corporation, Tokyo (JP)

(72) Inventors: Satoru Okagaki, Tokyo (JP); Masatoshi Nishimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/563,393

(22) PCT Filed: May 28, 2021

(86) PCT No.: PCT/JP2021/020331
§ 371 (c)(1),
(2) Date: Nov. 22, 2023

(87) PCT Pub. No.: WO2022/249433
PCT Pub. Date: Dec. 1, 2022

(65) Prior Publication Data
US 2024/0264356 A1  Aug. 8, 2024

(51) Int. Cl.
*F21V 8/00* (2006.01)
(52) U.S. Cl.
CPC ......... *G02B 6/0033* (2013.01); *G02B 6/0088* (2013.01)
(58) Field of Classification Search
CPC .................. G02B 6/0033; G02B 6/0088
See application file for complete search history.

(56) References Cited

U.S. PATENT DOCUMENTS

| | | | |
|---|---|---|---|
| RE46,418 E | 5/2017 | Di Trapani et al. | |
| 10,182,483 B2* | 1/2019 | Takeshita | F21V 7/0008 |
| 2008/0204888 A1* | 8/2008 | Kan | F21V 13/04 |
| | | | 359/629 |
| 2014/0192509 A1 | 7/2014 | Di Trapani et al. | |

(Continued)

FOREIGN PATENT DOCUMENTS

| | | |
|---|---|---|
| JP | 2-271304 A | 11/1990 |
| JP | 6081663 B2 | 2/2017 |

(Continued)

OTHER PUBLICATIONS

Fujii et al., WO 2019220656, Nov. 2019 (Year: 2019).*

(Continued)

*Primary Examiner* — Mary Ellen Bowman
(74) *Attorney, Agent, or Firm* — XSENSUS LLP (57) ABSTRACT

First light is incident on a diffuser, and scattered light emerges from the diffuser. The diffuser includes one light incident surface on which the first light is incident in a first direction and a first light transmitting surface. The light incident surface is formed on an end surface of the diffuser. First transmitted light emerges from the first light transmitting surface. Second transmitted light emerges from second light transmitting surface that is a surface other than the first light transmitting surface of the diffuser. Intensity of the first transmitted light increases as a direction in which the first transmitted light emerges approaches the first direction. Correlated color temperature of the first light is lower than correlated color temperature of the first transmitted light and higher than correlated color temperature of the second transmitted light.

15 Claims, 4 Drawing Sheets

(56) References Cited

U.S. PATENT DOCUMENTS

| | | |
|---|---|---|
| 2016/0273723 A1 | 9/2016 | Van Gheluwe et al. |
| 2018/0098399 A1 | 4/2018 | Takeshita et al. |
| 2021/0190279 A1 | 6/2021 | Fujii et al. |
| 2022/0221130 A1 | 7/2022 | Okagaki et al. |
| 2022/0268988 A1 | 8/2022 | Yamazaki et al. |

FOREIGN PATENT DOCUMENTS

| | | |
|---|---|---|
| JP | 2018-060624 A | 4/2018 |
| WO | 2019/220656 A1 | 11/2019 |
| WO | 2020/175523 A1 | 9/2020 |
| WO | 2020/240664 A1 | 12/2020 |
| WO | 2021/038709 A1 | 3/2021 |

OTHER PUBLICATIONS

Fujii et al., WO 2020240933, Dec. 2020 (Year: 2020).*
Nishimura et al., WO 2023054364, Apr. 2023 (Year: 2023).*
International Preliminary Report On Patentability (Chapter I) issued on Nov. 21, 2023, in corresponding PCT/JP2021/020331, 7 pages.
Japanese Office Action issued Feb. 13, 2024, in corresponding Japanese Patent Application No. 2023-123969, 8pp.
International Search Report and Written Opinion mailed on Jul. 27, 2021, received for PCT Application PCT/JP2021/020331, filed on May 28, 2021, 13 pages including English Translation.
Extended European Search Report issued Apr. 26, 2024, in corresponding EP Patent Application No. 21943078.2, 8pp.
Chinese Office Action issued Jun. 27, 2024, in corresponding Chinese Patent Application 202180098508.8, 9pp.

\* cited by examiner

DIFFUSER AND LIGHTING APPARATUS

CROSS-REFERENCE TO RELATED APPLICATION

This application is based on PCT filing PCT/JP2021/020331, filed May 28, 2021, the entire contents of which are incorporated herein by reference.

TECHNICAL FIELD

The present disclosure relates to a diffuser and a lighting apparatus.

BACKGROUND ART

There is a proposal for a lighting apparatus that is mounted in a ceiling recess and includes a pseudo-skylight form (see, for example, Patent Reference 1). This lighting apparatus includes a lighting panel mounted in the ceiling recess and a sidewall around it. The sidewall includes a triangular light-emitting area, which is independently controllable, and is modeled on a sunlit portion and a shadow portion. The sunlit portion and the shadow portion are modeled on the sunlit region, which would be formed by light coming through the skylight if the lighting panel were an actual skylight, and the shadow region, which is not illuminated.

PRIOR ART REFERENCE

Patent Reference

Patent Reference 1: Japanese Patent No. 6081663

SUMMARY OF THE INVENTION

Problem to be Solved by the Invention

However, in Patent Reference 1, when an observer observes the lighting panel, the brightness and color of the lighting panel are different from natural scenery (e.g., natural blue sky), which causes disadvantageously the observer to feel unnatural.

It is an object of the present disclosure to provide an observer with realistic artificial scenery as if it was illuminated by sunlight coming in from the sun even in an environment where a blue sky is not visible and there is no actual sunlight coming in from the sun.

Means of Solving the Problem

A diffuser according to an aspect of the present disclosure is a diffuser on which first light is incident and from which light including scattered light emerges. The diffuser includes: a light incident surface on which the first light is incident in a first direction; and a first light transmitting surface, wherein the light incident surface is formed on an end surface of the diffuser, first transmitted light emerges from the first light transmitting surface, second transmitted light emerges from second light transmitting surface that is a surface other than the first light transmitting surface of the diffuser, intensity of the first transmitted light increases as a direction in which the first transmitted light emerges approaches the first direction, and correlated color temperature of the first light is lower than correlated color temperature of the first transmitted light and higher than correlated color temperature of the second transmitted light.

Effects of the Invention

According to the present disclosure, realistic artificial scenery as if it was illuminated by sunlight coming in from the sun can be provided to an observer.

MODE FOR CARRYING OUT THE INVENTION

A diffuser and a lighting apparatus according to embodiments of the present disclosure will now be described below with reference to the attached drawings. The following embodiments are merely examples, and the embodiments may be combined as appropriate and each embodiment may be modified as appropriate.

In order to facilitate understanding of the description, the drawings show the coordinate axes of an XYZ orthogonal coordinate system. The Y-axis direction is a direction of a normal to a light transmitting surface of the diffuser. It should be noted that if the light transmitting surface includes a curved or inclined surface or both of these surfaces, the Y-axis direction may be a direction of a normal to the center portion of the light transmitting surface or a direction indicated by the sum of the normal vectors to the light transmitting surface. When a lighting apparatus is mounted on a ceiling, the −Y-axis direction is the vertical downward direction and the +Y-axis direction is the vertical upward direction. The X-axis direction and the Z-axis direction are perpendicular to the Y-axis direction. When the lighting apparatus is mounted on the ceiling, the X-axis direction and the Z-axis direction are horizontal directions. The +Z-axis direction is a direction in which incident light from the light incident surface travels in the diffuser.

First Embodiment

Figure 1:
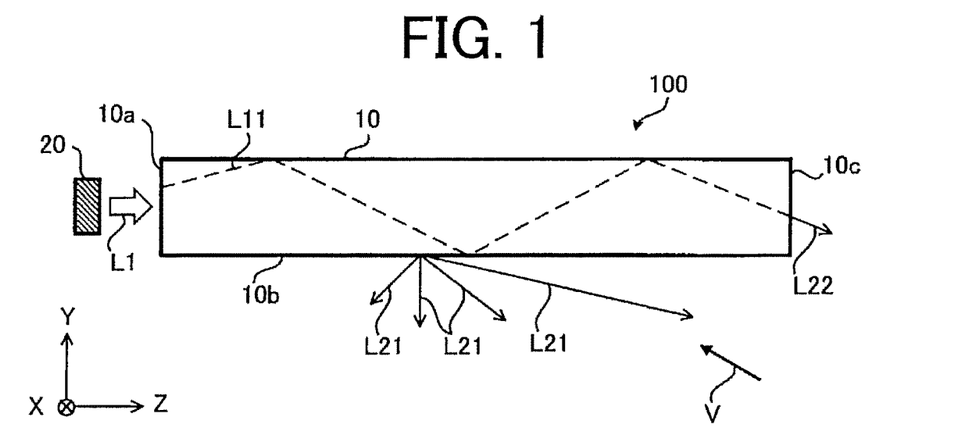
FIG. 1 is a cross-sectional view showing a schematic configuration of a lighting apparatus according to a first embodiment.

FIG. 1 is a cross-sectional view showing a schematic configuration of a lighting apparatus 100 according to a first embodiment. As shown in FIG. 1, the lighting apparatus 100 includes a diffuser 10 and a light source 20.

The light source 20 emits light L1 as first light. The light source 20 emits the light L1 toward a light incident surface 10a, for example. The light source 20 is disposed, for example, so as to face the light incident surface 10a. It should be noted that the light source 20 is also referred to as a "first light source 20" in the following description.

The diffuser 10 is, for example, a plate-shaped member. The diffuser 10 includes the light incident surface 10a and a first light transmitting surface 10b. The diffuser 10 guides the light L1 incident on the light incident surface 10a with total internal reflection and scatters at least part of the light L1, and thus the part of the light L1 emerges from the first light transmitting surface 10b (X-Z plane). In FIG. 1, the totally internally reflected light is indicated by a reference sign L11.

The light L1 emitted from the light source 20 is incident on the light incident surface 10a in the Z-axis direction as a first direction. Thus, the light incident surface 10a is an end surface that is in contact with an end of the first light transmitting surface 10b in the −Z-axis direction. Thus, the light incident surface 10a is formed on the end surface, which includes the end of the first light transmitting surface 10b, of the diffuser 10. In an example shown in FIG. 1, the diffuser 10 includes one light incident surface 10a. It is noted that the diffuser 10 has only to include at least one light incident surface 10a. In other words, the light incident surface 10a may include a plurality of end surfaces of the diffuser 10, and the light L1 may be incident on each of the end surfaces.

One example of a specific configuration of the diffuser 10 is a light guide panel, which is a light transmitting member that diffuses light by transmitting, reflecting, and guiding light. In this case, the light guide panel includes a transparent resin and a scattering structure that scatters incident light to generate scattered light. The scattering structure is formed of scattering particles having a refractive index different from that of the diffuser 10, a crystal, a void, or a recess on a surface of the diffuser 10. In the following description, an example where the diffuser 10 is formed of a transparent resin 11 and scattering particles 12 will be described.

Figure 2:
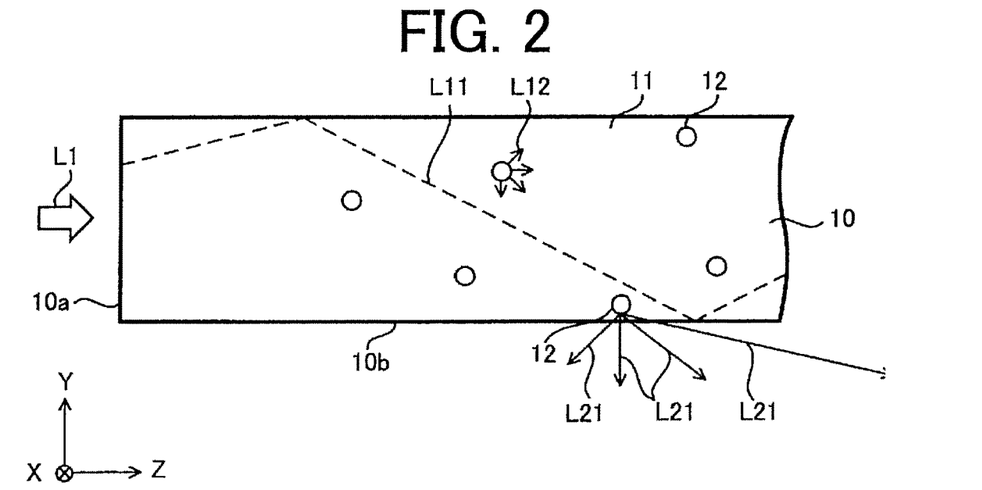
FIG. 2 is an enlarged cross-sectional view of a diffuser shown in FIG. 1.

FIG. 2 is an enlarged cross-sectional view of the diffuser 10 shown in FIG. 1. As shown in FIG. 2, the diffuser 10 is formed, for example, of the transparent resin 11, which is a transparent resin member, and the plurality of scattering particles 12 dispersed in the transparent resin 11.

Next, a scattering phenomenon in the diffuser 10 will now be described. Part of the incident light L1 that enters the diffuser 10 from the light incident surface 10a is scattered from the scattering particles 12. In FIG. 2, the light generated by scattering is indicated by reference signs L12. The light L12 depends on a scattering angle and a wavelength of the light L1. If the size of the scattering particle 12 is sufficiently small relative to the wavelength of the light L1, the light L12 is isotropic, so the dependence on the scattering angle is small, and the scattering intensity of the light L1 at a short wavelength is relatively higher than the scattering intensity of the light L1 at a long wavelength. On the other hand, if the size of the scattering particle 12 is close to the wavelength of the light L1, the degree of forward scattering is relatively larger than that of back scattering. Also, if the size of the scattering particle 12 is close to the wavelength of the light L1, the scattering intensity of the light L1 at a short wavelength is relatively higher than the scattering intensity of the light L1 at a long wavelength.

As shown in FIG. 1, at least part of the light L1 incident on the inside of the diffuser 10 emerges as first transmitted light L21 and second transmitted light L22. The first transmitted light L21 emerges from the first light transmitting surface 10b. The second transmitted light L22 emerges from the second light transmitting surface 10c, which is a surface other than the first light transmitting surface 10b of the diffuser 10. In an example shown in FIG. 1, the second light transmitting surface 10c is an end surface facing the +Z-axis direction of the diffuser 10. It should be noted that the second light transmitting surface 10c is not limited to the end surface facing the +Z-axis direction. The second light transmitting surface 10c may be at least one of the end surface facing the +Y-axis direction or the end surface facing the −Y-axis direction of the diffuser 10 and may be the end surface facing the −Z-axis direction. In other words, the second light transmitting surface 10c has only to include at least one of the end surface facing the +Y-axis direction, the end surface facing the −Y-axis direction, the end surface facing the +Z-axis direction, or the end surface facing the −Z-axis direction of the diffuser 10, and the second light transmitting surface 10c may be composed of a combination of at least two selected from these end surfaces. The diffuser 10 may be composed of a combination of these end faces. Also, the diffuser 10 has only to include at least one first light transmitting surface 10b. For that reason, the diffuser 10 may include a plurality of the first light transmitting surfaces 10b.

Thus, the scattering particles 12 causes multiple scattering to the incident light L1 and consequently at least part of the light L1 emerges from the diffuser 10 as the first transmitted light L21 and the second transmitted light L22. Also, at least part of the incident light L1 is not scattered and emerges from the diffuser 10 as part of the second transmitted light L22.

As described above, if the size of the scattering particle 12 is close to the wavelength of the light L1, the scattered light L12 has a strong tendency toward forward scattering, which is scattering in an incident direction of the light L1 (in other words, the direction in which the light L1 emitted from the light source 20). Since the same tendency is shown in the case where multiple scattering occurs in the diffuser 10, the first transmitted light L21 depends on an angle. That is, the intensity of the first transmitted light L21 increases as the direction in which the first transmitted light L21 emerges approaches the +Z-axis direction from the direction of the normal (Y-axis direction) to the first light transmitting surface 10b.

The scattering intensity due to the scattering particle 12 at a long wavelength of the light L1 is lower than the scattering intensity at a short wavelength of the light L1. For that reason, for example, when the light L1 containing a wide wavelength spectrum is incident on the light incident surface 10a, the light L1 of a short wavelength is preferentially scattered, and thus the correlated color temperature of the first transmitted light L21 is higher than the correlated color temperature of the light L1. This phenomenon is identical to the principle of the actual generation of a blue sky and is effective for making the diffuser 10 appear as a blue sky to an observer. Also, the second transmitted light L22 includes light, which has been scattered, and light, which has not been scattered, of the incident light L1. For that reason, the correlated color temperature of the light L1 is lower than the correlated color temperature of the first transmitted light L21 and higher than the correlated color temperature of the second transmitted light L22.

Also, as an example of a suitable configuration of the diffuser 10 according to the first embodiment, the average particle diameter of the plurality of scattering particles 12 is in the range of 10 nm to 3000 nm inclusive, and more preferably in the range of 50 nm to 2000 nm inclusive. Accordingly, the intensity of the first transmitted light L21 increases as the direction in which the first transmitted light L21 emerges approaches the +Z-axis direction from the direction of the normal (Y-axis direction) to the first light transmitting surface 10b.

In addition, a suitable example of the difference between the correlated color temperature of the first transmitted light L21 and the correlated color temperature of the second transmitted light L22 is substantially equal to or less than 100 K. Also, let be 0 degrees the angle of emergence made by the first transmitted light L21 when the first transmitted light L21 travels in the Z-axis direction, and let be 90 degrees the angle of emergence made by the first transmitted light L21 when the first transmitted light L21 travels in the direction of the normal to the first light transmitting surface 10b. A suitable example of the ratio of the intensity of the first transmitted light L21 when the angle of emergence is 45 degrees to the intensity of the first transmitted light L21 when the angle of emergence is 90 degrees in the range of 1.01 times to 10 times inclusive, and more preferably in the range of 1.1 times to 5 times inclusive.

Suppose an observer observes the first light transmitting surface 10b in the +Y-axis direction in the case where the diffuser 10 is mounted on an indoor ceiling and the light source 20 is fixed near the light incident surface 10a. At this time, the first transmitted light L21 enables the observer to see the first light transmitting surface 10b like a blue sky. Also, the luminance of the first light transmitting surface 10b in the case where an observer observes the first light transmitting surface 10b in an oblique direction (e.g., in the direction of an arrow V shown in FIG. 1), which is the direction approaching toward the incident direction (i.e., the +Z-axis direction) of the light L1 from the direction of the normal to the first light transmitting surface 10b, is higher than the luminance in the case where the observer observes the first light transmitting surface 10b in the direction of the normal to the first light transmitting surface 10b (i.e., in the vertical downward direction). A change in the luminance of the first light transmitting surface 10b due to such a change in the line of sight of the observer (hereafter, also referred to as an "observation change") is a phenomenon that also occurs in a natural blue sky. In also the case where a person actually observes a natural blue sky, the luminance of the blue sky changes depending on the altitude and the position of the sun. That is, the diffuser 10 according to the first embodiment can reproduce a more realistic blue sky compared to the conventional technology. Therefore, according to the first embodiment, even in an environment where a blue sky is not visible and there is no actual sunlight coming in from the sun, realistic artificial scenery as if it was illuminated by sunlight coming in from the sun can be provided to the observer.

Also, when the observation change of the first light transmitting surface 10b is minute, for example, when the first light transmitting surface 10b is observed from directly below the diffuser 10, it is preferable that the change in the luminance of the first light transmitting surface 10b should be small. For that reason, the intensity of the first transmitted light L21 is set equal to or lower than the intensity of the second transmitted light L22 by designing the intensity of diffusion in the diffuser 10 with the size or concentration of the scattering particles 12. Accordingly, the diffuser 10 can reproduce a more realistic blue sky.

Also, in an example shown in FIG. 1, the diffuser 10 has one light incident surface 10a, but the change in the luminance of the first light transmitting surface 10b can be further reduced by having two or more light incident surfaces 10a. Accordingly, as described above, a realistic blue sky can be reproduced.

Advantages of First Embodiment

According to the above described first embodiment, the intensity of the first transmitted light L21 increases as the direction in which the first transmitted light L21 emerges approaches the +Z-axis direction, which is the incident direction of the light L1. Also, the correlated color temperature of the light L1 is lower than the correlated color temperature of the first transmitted light L21 and higher than the correlated color temperature of the second transmitted light L22. Accordingly, a change in the luminance of the first light transmitting surface 10b can be produced when the observation change of the first light transmitting surface 10b occurs. This change in the luminance of the first light transmitting surface 10b due to the observation change is a phenomenon that also occurs when a person views a natural blue sky. Therefore, even in an environment where a blue sky is not visible and there is no actual sunlight coming in from the sun, realistic artificial scenery as if it was illuminated by sunlight coming in from the sun can be provided to the observer.

Also, according to the first embodiment, the diffuser 10 includes the transparent resin 11 provided with the light incident surface 10a and the first light transmitting surface 10b, and the plurality of scattering particles 12 dispersed in the transparent resin 11. The scattering particles 12 are dispersed in the transparent resin 11 so that the intensity of the first transmitted light L21 increases as the direction in which the first transmitted light L21 emerges approaches the Z-axis direction and the correlated color temperature of the light L1 is lower than the correlated color temperature of the first transmitted light L21 and higher than the correlated color temperature of the second transmitted light L22. Accordingly, when the observation change of the first light transmitting surface 10b occurs, a change in the luminance of the first light transmitting surface 10b can be produced, and the same phenomenon as when a person views a natural blue sky can be produced.

Also, according to the first embodiment, the intensity of the first transmitted light L21 is equal to or lower than the intensity of the second transmitted light L22. Accordingly, when the first light transmitting surface 10b is observed from directly below the diffuser 10, the change in the luminance of the first light transmitting surface 10b is small. Therefore, the diffuser 10 can reproduce a more realistic blue sky.

Second Embodiment

Figure 3:
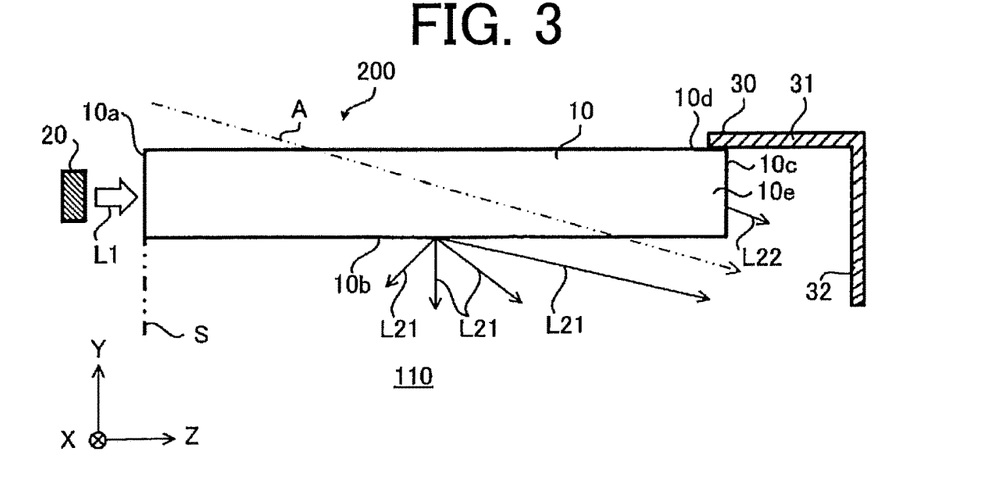
FIG. 3 is a cross-sectional view showing a schematic configuration of a lighting apparatus according to a second embodiment.

FIG. 3 is a cross-sectional view showing a schematic configuration of a lighting apparatus 200 according to a second embodiment. In FIG. 3, each component identical or corresponding to a component shown in FIG. 1 is assigned the same reference sign as those in FIG. 1. The lighting apparatus 200 according to the second embodiment is different from the lighting apparatus 100 according to the first embodiment in that the lighting apparatus 200 further includes a frame 30. With respect to the other points, the lighting apparatus 200 according to the second embodiment is the same as the lighting apparatus 100 according to the first embodiment.

As shown in FIG. 3, the lighting apparatus 200 includes the diffuser 10, the light source 20, and the frame 30.

The frame 30 is disposed on an end portion on the opposite side of the diffuser 10 from the light incident surface 10a. In an example shown in FIG. 3, the frame 30 is disposed on an end portion 10e in the +Z-axis direction of the diffuser 10. The end portion 10e in the +Z-axis direction is an end portion that includes the second light transmitting surface 10c, of the diffuser 10. The frame 30 includes a portion opposite a plane S that includes the light incident surface 10a.

The frame 30 includes a first portion 31, which is a portion fixed to an end surface 10d facing the +Y-axis direction of the end portion 10e in the +Z-axis direction of the diffuser 10, and a second portion 32 opposite the plane S. The first portion 31 extends in the Z-axis direction. The second portion 32 extends in the −Y-axis direction from the end in +Z-axis direction of the first portion 31.

The frame 30 is formed from a light-transmitting material or a light-reflecting material. The frame 30 is composed of metal, resin, glass, or film, for example. The frame 30 sends incident light toward a space where an observer is present by reflecting, diffusing, or transmitting the incident light. Accordingly, when the observer observes the lighting apparatus 200, the frame 30 can be perceived by the observer as an area of higher luminance than other areas of the lighting apparatus 200. For that reason, it is possible to provide the observer with artificial scenery as if sunlight came in the frame 30 in the direction of the arrow A shown in FIG. 3. Therefore, the observer can be given more realistic artificial scenery.

The light incident on the frame 30 is, for example, at least part of the light L1 emitted from the light source 20, the first transmitted light L21, or the second transmitted light L22. As described above, in an example shown in FIG. 3, the frame 30 is fixed to the end portion 10e, which includes the second light transmitting surface 10c, in the +Z-axis direction in the diffuser 10. Since the second transmitted light L22 emerges from the second light transmitting surface 10c, the light incident on the frame 30 is mainly the second transmitted light L22. Also, another light source (not shown) different from the light source 20 may be disposed in the vicinity of the frame 30. In this case, the frame 30 reflects, diffuses, or transmits incident light from such other light source, thereby being possible to make the luminance of the frame 30 higher than the luminance of other areas of the lighting apparatus 200.

Advantages of Second Embodiment

According to the second embodiment described above, as in the first embodiment, a change in the luminance of the first light transmitting surface 10b can be produced when the observation change of the first light transmitting surface 10b occurs. This change in the luminance of the first light transmitting surface 10b due to the observation change is a phenomenon that also occurs when a person views a natural blue sky. Therefore, even in an environment where a blue sky is not visible and there is no actual sunlight coming in from the sun, realistic artificial scenery as if it was illuminated by sunlight coming in from the sun can be provided to the observer.

Also, according to the second embodiment, the lighting apparatus 200 includes a frame 30 disposed on the end portion 10e on the opposite side of the diffuser 10 from the light incident surface 10a. Accordingly, light emerging from the diffuser 10 (e.g., first transmitted light L21, second transmitted light L22, etc.) is incident on the frame 30 and consequently the luminance of the frame 30 can be made higher than the luminance of other areas of the lighting apparatus 200. For that reason, it is possible to provide the observer with artificial scenery as if sunlight came in the frame 30. Therefore, the observer can be given more realistic artificial scenery.

First Modification of Second Embodiment

Figure 4:
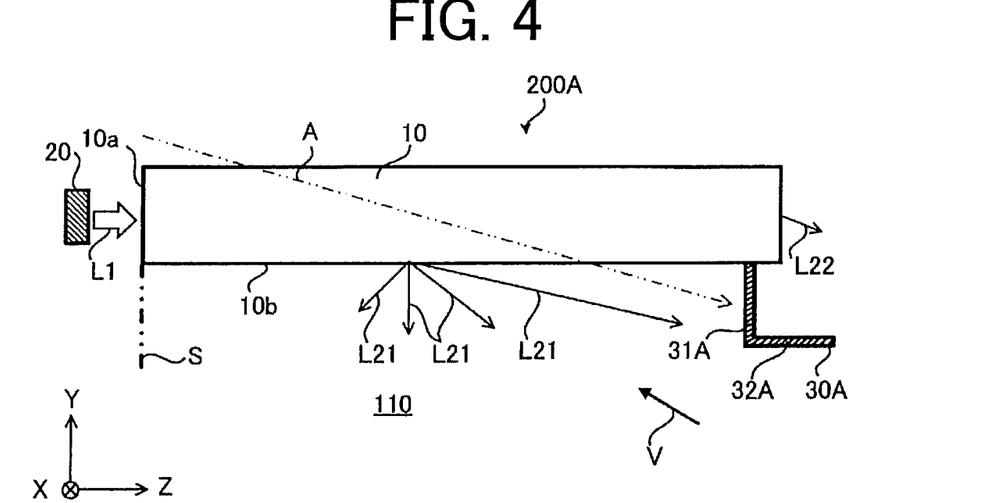
FIG. 4 is a cross-sectional view showing an example of a schematic configuration of a lighting apparatus according to a first modification of the second embodiment.
Figure 5:
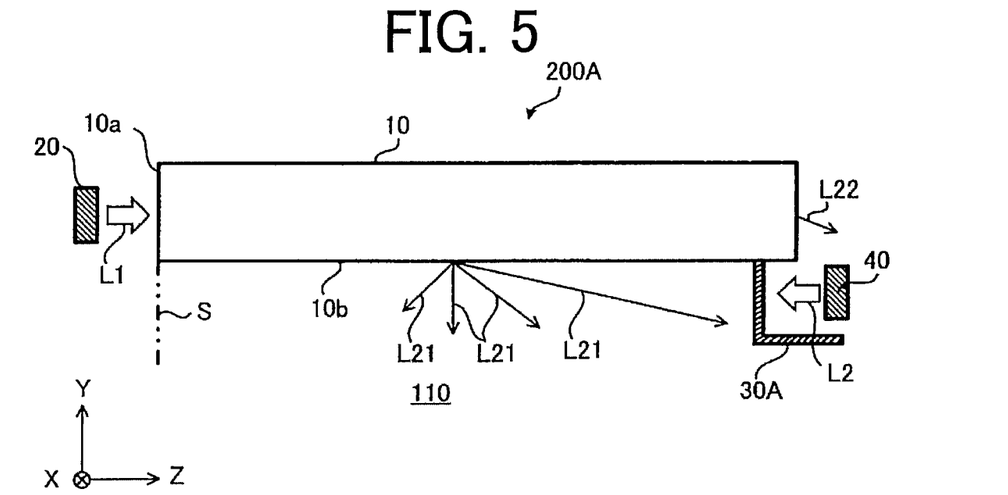
FIG. 5 is a cross-sectional view showing another example of a schematic configuration of a lighting apparatus according to the first modification of the second embodiment.
Figure 6:
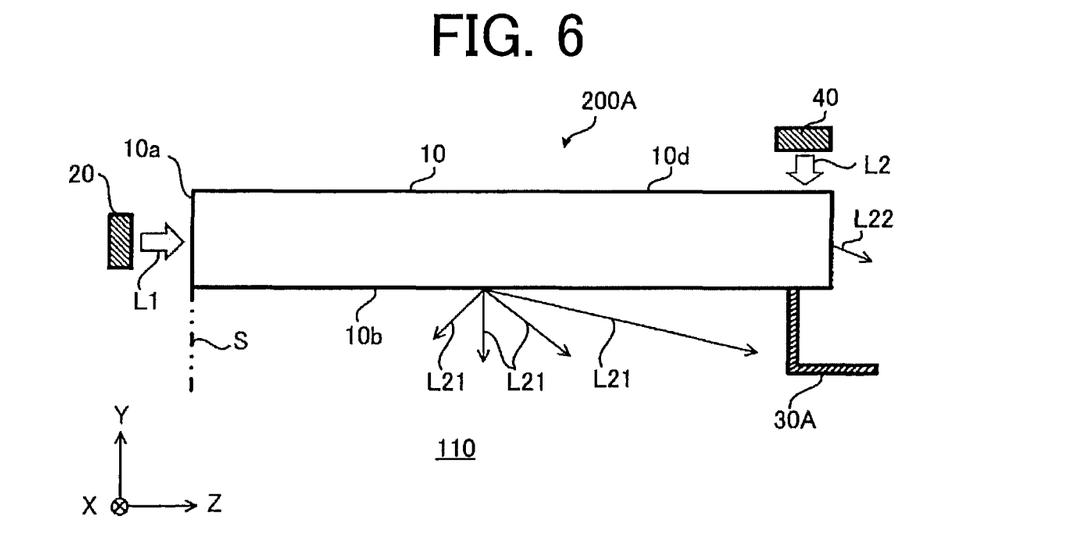
FIG. 6 is a cross-sectional view showing another example of a schematic configuration of the lighting apparatus according to the first modification of the second embodiment.
Figure 7:
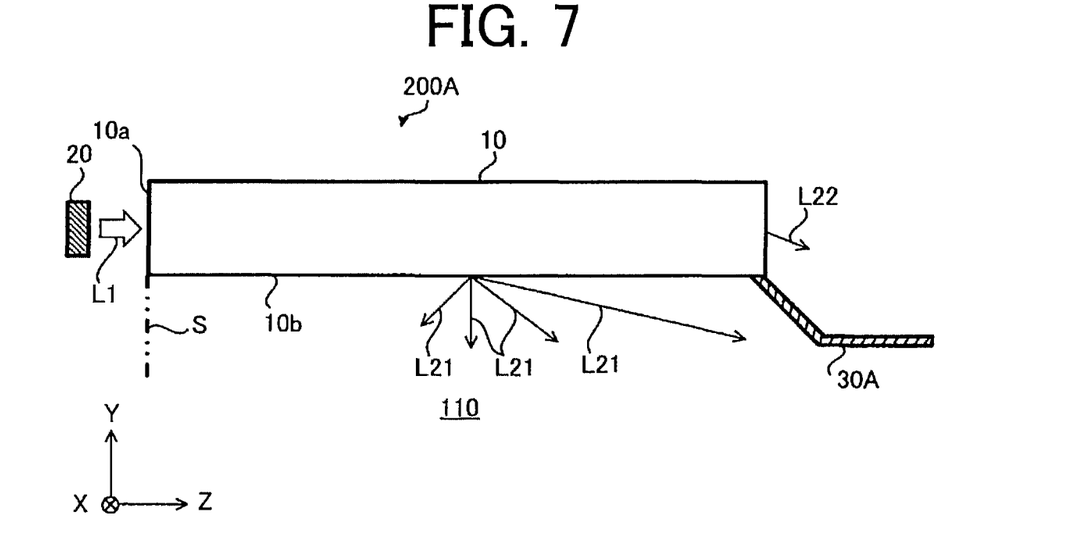
FIG. 7 is a cross-sectional view showing another example of a schematic configuration of the lighting apparatus according to the first modification of the second embodiment.

FIG. 4 is a cross-sectional view schematically showing an example of a configuration of a lighting apparatus 200A according to a first modification of the second embodiment. FIG. 5, FIG. 6, and FIG. 7 are cross-sectional views schematically showing other examples of the configuration of the lighting apparatus 200A according to the first modification of the second embodiment. In FIGS. 4 to 7, each component identical or corresponding to a component shown in FIG. 3 is assigned the same reference sign as those in FIG. 3. The lighting apparatus 200A according to the first modification of the second embodiment is different in a position of the frame 30A from the lighting apparatus 200 according to the second embodiment. With respect to the other points, the lighting apparatus 200A according to the first modification of the second embodiment is the same as the lighting apparatus 200 according to the second embodiment.

As shown in FIG. 4, the lighting apparatus 200A includes the diffuser 10, the light source 20, and the frame 30A.

In the example shown in FIG. 4, the frame 30A is also disposed on the end portion 10e in the +Z-axis direction of the diffuser 10, as in the frame 30 shown in FIG. 3. Specifically, the frame 30A is disposed at a position opposite the plane S including the light incident surface 10a and in contact with the first light transmitting surface 10b. In this case also, at least part of the light L1 emitted from the light source 20, the first transmitted light L21, or the second transmitted light L22 is incident on the frame 30A. The frame 30A reflects, diffuses, or transmits incident light, thereby being possible to make the luminance of the frame 30A higher than the luminance of other areas of the lighting apparatus 200A.

The frame 30A includes a first portion 31A that is a portion fixed to the first light transmitting surface 10b and facing a plane S including the light incident surface 10a, and a second portion 32A that is a portion extending in the +Z-axis direction from the end in the −Y-axis direction of the first portion 31A. In an example shown in FIG. 4, the angle formed by the first portion 31A and the second portion 32A is at right angles.

As shown in FIG. 5, the lighting apparatus 200A may further include a second light source 40 disposed in the vicinity of the frame 30A. The second light source 40 is disposed outside the frame 30A. Specifically, the second light source 40 is disposed opposite the second portion 32A of the frame 30A in the −Y-axis direction and on the +Z-axis side from the second light transmitting surface 10c of the diffuser 10. The second light source 40 emits light L2 as second light. The second light source 40 includes, for example, the same configuration as the first light source 20. It should be noted that the second light source 40 may include a different configuration from the first light source 20.

In an example shown in FIG. 5, the frame 30A guides the light L2 coming from the second light source 40 to the space 110 (i.e., the space to which the first transmitted light L21 travels) facing the first light transmitting surface 10b. Specifically, the frame 30A, for example, reflects, diffuses, or transmits the light L2. Accordingly, the luminance of the frame 30A can be made even higher than the luminance of other areas of the lighting apparatus 200A.

As shown in FIG. 6, the second light source 40 may be disposed in the vicinity of the end surface 10d, which is located on the opposite side of the diffuser 10 from the first light transmitting surface 10b, facing the +Y-axis direction. In an example shown in FIG. 6, the second light source 40 is disposed on the +Y-axis side from the end surface 10d, which faces the +Y-axis direction, of the diffuser 10. In other words, the second light source 40 may be disposed at a position facing the end surface 10d, which faces the +Y-axis direction, of the diffuser 10. In this case, the frame 30A, for example, reflects, diffuses, or transmits the light L2 emitted by the second light source 40 and transmitted through the diffuser 10. Thus, the frame 30A may guide at least part of the light L2 to the space 110 facing the first light transmitting surface 10b. In an example shown in FIG. 6, the luminance of the frame 30A can be even higher than the luminance of other areas of the lighting apparatus 200A.

The shape of the frame 30A is not limited to the shapes shown in FIGS. 4 to 6. As shown in FIG. 7, the first portion 31A, which is fixed to the first light transmitting surface 10b, of the frame 30A may be inclined with respect to a normal to the first light transmitting surface 10b so that the space in front of the first light transmitting surface 10b expands with being away from the first light transmitting surface 10b.

Advantages of First Modification of Second Embodiment

According to the first modification of the second embodiment described above, as in the first embodiment and the second embodiment, a change in the luminance of the first light transmitting surface 10b can be produced when the observation change of the first light transmitting surface 10b occurs. This change in the luminance of the first light transmitting surface 10b due to the observation change is a phenomenon that also occurs when a person views a natural blue sky. Therefore, even in an environment where a blue sky is not visible and there is no actual sunlight coming in from the sun, realistic artificial scenery as if it was illuminated by sunlight coming in from the sun can be provided to the observer.

Also, according to the first modification of the second embodiment, the lighting apparatus 200A includes the frame 30A disposed at the position opposite the plane S including the light incident surface 10a and in contact with the first light transmitting surface 10b of the diffuser 10. Accordingly, the first transmitted light L21 emerging from the first light transmitting surface 10b easy to be incident on the frame 30A and consequently the luminance of the frame 30A can be made higher than the luminance of other areas of the lighting apparatus 200A. For that reason, it is possible to provide the observer with artificial scenery as if sunlight came in the frame 30A. Therefore, since the observer develops awareness of the position of the sun, the observer can be given more realistic artificial scenery.

Also, according to the first modification of the second embodiment, the lighting apparatus 200A further includes the second light source 40 to emit the light L2, the frame 30A guides at least part of the light L2 to the space 110 facing the first light transmitting surface 10b. Accordingly, the light L2 emitted by the second light source 40 is incident on the frame 30A, the frame 30A reflects, diffuses, or transmits the light L2 incident thereon, and consequently the luminance of the frame 30A can be made even higher than the luminance of other areas of the lighting apparatus 200A.

Second Modification of Second Embodiment

Figure 8:
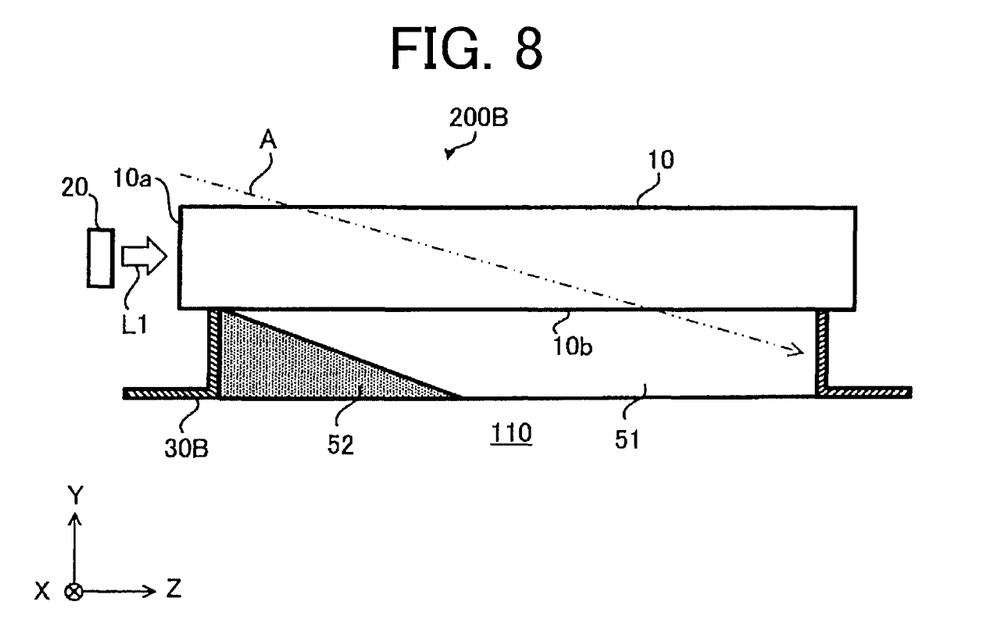
FIG. 8 is a cross-sectional view showing a schematic configuration of a lighting apparatus according to a second modification of the second embodiment.

FIG. 8 is a cross-sectional view showing a schematic configuration of a lighting apparatus 200B according to a second modification of the second embodiment. In FIG. 8, each component identical or corresponding to a component shown in FIG. 3 is assigned the same reference sign as those in FIG. 3. The lighting apparatus 200B according to the second modification of the second embodiment is different in a configuration of a frame 30B from the lighting apparatus 200 according to the second embodiment. With respect to the other points, the lighting apparatus 200B according to the second modification of the second embodiment is the same as the lighting apparatus 200 according to the second embodiment.

As shown in FIG. 8, the lighting apparatus 200B includes the diffuser 10, the light source 20, and the frame 30B.

In an example shown in FIG. 8, the frame 30B is a member (casing) that surrounds the space 110 facing the first light transmitting surface 10b. It should be noted that frame 30B may be a casing that surrounds the diffuser 10. In addition, the frame 30B may be a casing that surrounds both the space 110 facing the first light transmitting surface 10b and the diffuser 10.

The frame 30B encloses a bright region 51 and a dark region 52. The bright region 51 is a region where the luminance is high, and the dark region 52 is a region where the luminance is lower than the bright region 51. The bright region 51 and the dark region 52 are formed by providing regions of different light transmittance or light reflectance in the frame 30B. An observer can perceive the bright region 51 and the dark region 52 as if they were a sunny place and shade respectively formed on a window frame. In other words, the observer can feel as if actual sunlight, namely natural light, came through the diffuser 10 in the direction of the arrow A shown in FIG. 8. Therefore, the observer can further feel that the lighting apparatus 200B reproduces a pseudo blue sky.

Advantages of Second Modification of Second Embodiment

According to the second modification of the second embodiment described above, as in the first embodiment and the second embodiment, a change in the luminance of the first light transmitting surface 10b can be produced when the observation change of the first light transmitting surface 10b occurs. This change in the luminance of the first light transmitting surface 10b due to the observation change is a phenomenon that also occurs when a person views a natural blue sky. Therefore, even in an environment where a blue sky is not visible and there is no actual sunlight coming in from the sun, realistic artificial scenery as if it was illuminated by sunlight coming in from the sun can be provided to the observer.

Also, according to the second modification of the second embodiment, the frame 30B of the lighting apparatus 200B encloses the bright region 51 and the dark region 52. Accordingly, an observer can perceive the bright region 51 and the dark region 52 as if they were a sunny place and shade respectively formed on a window frame. In other words, the observer can feel as if actual sunlight, namely natural light, came through the diffuser 10. Therefore, the observer can feel that the lighting apparatus 200B reproduces a pseudo blue sky.

DESCRIPTION OF REFERENCE CHARACTERS 10 diffuser, 10a light incident surface, 10b first light transmitting surface, 10c second light transmitting surface, 10e end portion, 11 transparent resin, 12 scattering particles, 20 light source (first light source), 30, 30A, 30B frame, 40 second light source, 51 bright region, 52 dark region, 100, 200, 200A, 200B lighting apparatus, 110 space, L1 first light, L2 second light, L21 first transmitted light, L22 second transmitted light.

What is claimed is:

1. A diffuser on which first light is incident and from which light including scattered light emerges, comprising:
   a light incident surface on which the first light is incident in a first direction; and
   a first light transmitting surface,
   wherein the light incident surface is formed on an end surface of the diffuser,
   first transmitted light emerges from the first light transmitting surface,
   second transmitted light emerges from second light transmitting surface that is a surface other than the first light transmitting surface of the diffuser,
   intensity of the first transmitted light increases as a direction in which the first transmitted light emerges approaches the first direction, and
   correlated color temperature of the first light is lower than correlated color temperature of the first transmitted light and higher than correlated color temperature of the second transmitted light.

2. The diffuser according to claim 1, wherein the diffuser includes
   a resin member including the light incident surface, the first light transmitting surface, and the second light transmitting surface, and
   a plurality of scattering particles dispersed in the resin member.

3. The diffuser according to claim 2, wherein an average diameter of the plurality of scattering particles is 10 nm to 3000 nm inclusive.

4. The diffuser according to claim 3, wherein the average diameter of the plurality of scattering particles is 50 nm to 2000 nm inclusive.

5. The diffuser according to claim 1, wherein
   the light incident surface comprises a plurality of the end surfaces of the diffuser, and
   the first light is incident on each of the end surfaces.

6. A lighting apparatus comprising:
   the diffuser according to claim 1:
   a first light source to emit the first light; and
   a frame disposed on an end portion of the diffuser, the end portion being on an opposite side of the diffuser from the light incident surface.

7. The lighting apparatus according to claim 6 further comprising a second light source to emit second light, wherein
   the frame guides at least part of the second light to a space facing the first light transmitting surface.

8. The lighting apparatus according to claim 6, wherein the frame is a member surrounding the space facing the first light transmitting surface and encloses a bright region and a dark region.

9. The diffuser according to claim 2, wherein
   the light incident surface comprises a plurality of the end surfaces of the diffuser, and
   the first light is incident on each of the end surfaces.

10. The diffuser according to claim 3, wherein
    the light incident surface comprises a plurality of the end surfaces of the diffuser, and
    the first light is incident on each of the end surfaces.

11. The diffuser according to claim 4, wherein
    the light incident surface comprises a plurality of the end surfaces of the diffuser, and
    the first light is incident on each of the end surfaces.

12. A lighting apparatus comprising:
    the diffuser according to claim 2;
    a first light source to emit the first light; and
    a frame disposed on an end portion of the diffuser, the end portion being on an opposite side of the diffuser from the light incident surface.

13. A lighting apparatus comprising:
    the diffuser according to claim 3;
    a first light source to emit the first light; and
    a frame disposed on an end portion of the diffuser, the end portion being on an opposite side of the diffuser from the light incident surface.

14. A lighting apparatus comprising:
    the diffuser according to claim 4;
    a first light source to emit the first light; and
    a frame disposed on an end portion of the diffuser, the end portion being on an opposite side of the diffuser from the light incident surface.

15. A lighting apparatus comprising:
    the diffuser according to claim 5;
    a first light source to emit the first light; and
    a frame disposed on an end portion of the diffuser, the end portion being on an opposite side of the diffuser from the light incident surface.

* * * * *